(12) United States Patent
Le Besnerais

(10) Patent No.: US 8,508,164 B2
(45) Date of Patent: Aug. 13, 2013

(54) VIBRATION AND NOISE CONTROL STRATEGY IN ELECTRICAL MACHINES

(75) Inventor: Jean Le Besnerais, Mons en Baroeul (FR)

(73) Assignee: Siemens Aktiengesellschaft, München (DE)

( * ) Notice: Subject to any disclaimer, the term of this patent is extended or adjusted under 35 U.S.C. 154(b) by 243 days.

(21) Appl. No.: 13/036,772

(22) Filed: Feb. 28, 2011

(65) Prior Publication Data

US 2011/0215745 A1 Sep. 8, 2011

(30) Foreign Application Priority Data

Mar. 2, 2010 (EP) .................................... 10155213

(51) Int. Cl.
*H02K 29/06* (2006.01)
*H02P 6/10* (2006.01)

(52) U.S. Cl.
USPC ................. 318/400.23; 318/400.33; 318/114; 318/254.1; 318/701; 318/623

(58) Field of Classification Search
USPC ............ 318/400.23, 400.33, 114, 701, 254.1, 318/623
See application file for complete search history.

(56) References Cited

U.S. PATENT DOCUMENTS

| | | | |
|---|---|---|---|
| 4,260,923 A | | 4/1981 | Rawcliffe |
| 5,811,954 A * | | 9/1998 | Randall .......................... 318/701 |
| 5,814,965 A * | | 9/1998 | Randall .......................... 318/701 |
| 6,014,003 A * | | 1/2000 | French .......................... 318/701 |
| 6,051,942 A * | | 4/2000 | French .......................... 318/254.1 |
| 6,229,234 B1 * | | 5/2001 | Lambert et al. .................. 310/81 |
| 6,351,096 B1 | | 2/2002 | Jang |
| 6,384,549 B2 * | | 5/2002 | Lambert et al. ............... 318/114 |
| 7,448,854 B2 * | | 11/2008 | Jolly et al. ......................... 416/1 |
| 7,722,322 B2 * | | 5/2010 | Altieri et al. ...................... 416/1 |
| 2001/0017527 A1 * | | 8/2001 | Lambert et al. ............... 318/114 |
| 2006/0006744 A1 * | | 1/2006 | Nashiki ......................... 310/49 R |
| 2010/0221096 A1 * | | 9/2010 | Altieri et al. ...................... 415/1 |
| 2010/0327789 A1 * | | 12/2010 | De Belie et al. .......... 318/400.33 |

FOREIGN PATENT DOCUMENTS

| | | |
|---|---|---|
| JP | 2003174794 A | 6/2003 |
| JP | 2008236923 A | 10/2008 |

OTHER PUBLICATIONS

J. Le Besnerais, V. Lanfranchi, M. Hecquet and P. Brochet, "Characterization and Reduction of Audible Magnetic Noise due to PWM Supply in Induction Machines", IEEE Trans. on Ind. Elec, No. 99, Aug. 2009, pp. 1288-1295, (Abstract).
Jean Le Besnerais, Vincent Lanfranchi, Michel Hecquet, Pascal Brochet:"Characterization and Reduction of Audible Magnetic Noise Due to PWM Supply in Induction Machines", IEEE Transactions on Industrial Electronics, vol. 57, No. 4; Others; 2010.

* cited by examiner

*Primary Examiner* — Paul Ip

(57) ABSTRACT

An electrical machine device is disclosed, the electrical machine device including an electrical machine and a converter electrically coupled to the electrical machine. A configuration of the electrical machine generates a first vibration component in the electrical machine and the converter generates a second vibration component in the electrical machine. The electrical machine and the converter are adapted to each other such that the first vibration component and the second vibration component at least partially interfere destructively. Further, respective methods and computer programs for controlling a converter or operating a converter are disclosed.

10 Claims, 2 Drawing Sheets

VIBRATION AND NOISE CONTROL STRATEGY IN ELECTRICAL MACHINES

CROSS REFERENCE TO RELATED APPLICATIONS

This application claims priority of European Patent Office application No10155213.1 EP filed Mar. 2, 2010, which is incorporated by reference herein in its entirety.

FIELD OF THE INVENTION

The present invention relates to the field of electrical machines such as generators and motors.

ART BACKGROUND

Maxwell forces in the electrical machines and in particular in electrical machines air gaps generate high frequency (up to 6000 Hz) vibrations of the outer structure, e.g. of the rotor or stator depending on the topology of the electrical machine. This can result in strong vibration and noise levels.

An article of J. Le Besnerais, V. Lanfranchi, M. Hecquet, P. Brochet, "Characterization and reduction of audible magnetic noise due to PWM supply in induction machines" in IEEE Trans. on Ind. Elec, n 99, August 2009 refers to audible noise arising mainly from air-gap radial Maxwell forces that excite the stator in the audible range (magnetic noise). Analysis shows that by proper choice of a PWM switching frequency, a resonance of PWM exciting forces and corresponding stator modes can be avoided and hence the magnetic noise be reduced. However, such a noise reduction deals with resonance problems, but not with forced vibrations.

In view of the above-described situation, there exists a need for an improved technique that enables to provide an efficient electrical machine while substantially avoiding or at least reducing one or more of the above-identified problems.

SUMMARY OF THE INVENTION

This need may be met by the subject-matter according to the independent claims. Advantageous embodiments of the herein disclosed subject-matter are described by the dependent claims.

According to a first aspect of the invention, there is provided an electrical machine device comprising an electrical machine, wherein the electrical machine has a configuration which generates a first vibration component in the electrical machine. Further, the electrical machine device comprises a converter for converting electrical power, the converter being electrically coupled to the electrical machine. The converter generates a second vibration component in the electrical machine. Further, the configuration of the electrical machine and the converter are adapted to each other such that the first vibration component and the second vibration component at least partially interfere destructively.

This aspect of the invention is based on the idea that the vibrations and hence the global noise level generated by an electrical machine may be reduced if a main vibration component resulting from the configuration of the electrical machine is at least partially cancelled by a vibration component originating from a converter which is electrically coupled to the electrical machine (or vice versa). Reduced noise levels may provide more acoustic comfort and may reduce problems associated with strong vibrations, such as material fatigue.

Generally herein, the term "configuration of the electrical machine" may refer to an geometric configuration of the electrical machine (e.g. the configuration of poles, slots, windings) to a material configuration (e.g. to materials used to construct the electrical machine), etc.

According to an embodiment of the first aspect, the first vibration component is a magnetic force vibration. Herein, the term "magnetic force vibration" denotes a vibration which is due to a magnetic force in the electrical machine. According to a further embodiment, the second vibration component is a magnetic force vibration. Hence, according to an embodiment the first vibration component and/or the second vibration component are magnetic force vibrations. For example, in an embodiment, the magnetic force is a Maxwell force.

According to an embodiment, the term "adapting the configuration of the electrical machine and the converter to each other" includes adapting the converter to the electrical machine. According to another embodiment, the referenced term includes adapting the electrical machine to the converter. According to still other embodiments, the referenced term includes adapting both, the electrical machine and the converter.

According to an embodiment, the electrical machine comprises a rotor, a stator and an air gap between the rotor and the stator. In such a case, according to an embodiment the first vibration component is generated by a reluctance variation along the air gap of the electrical machine or any other harmonics linked the fundamental current, including in particular the interaction of rotor and stator mmf space harmonics.

According to an embodiment, the first vibration component is due to a Maxwell force linked with the fundamental current. Such a Maxwell force remains unchanged when feeding the electrical machine with non-sinusoidal currents. Hence, such Maxwell force and the resulting harmonics (Maxwell force harmonics) includes all force harmonics generated by air gap reluctance space harmonics which are for example, influenced by at least one of magnet shape, number of poles, slot shapes and numbers, and the force harmonics created by rotor and stator magnetomotive force (mmf) space harmonics.

According to an embodiment, the first vibration component that is used for destructive interference is the vibration component with the largest amplitude among all other first vibration components, i.e. vibration components which are due to a configuration of the electrical machine. However, according to other embodiments, other first vibration components may be used.

For example, according to embodiments, the first vibration component is due to at least one of
(i) a magnetomotive force (mmf) harmonic due to the discretization of stator and rotor winding in slots,
(ii) an air-gap permeance harmonic due to slotting effects,
(iii) an air-gap permeance harmonic due to saturation effects,
(iv) an air-gap permeance harmonic due to dynamic and eccentricity effects.

All these harmonics are included in the term "slotting harmonic", or harmonic linked with the fundamental current, used in this document.

According to a further embodiment, the second vibration component is generated by a pulse width modulation (PWM) operation of the converter. Pulse width modulation is often used in conjunction with variable speed electrical machines, and in particular with generators and motors. Coupling an electrical machine such as a generator or a motor with a converter that adds time harmonics due to pulse width modulation can result in strong vibration and noise levels.

According to a further embodiment, the converter is configured for generating pulses for said pulse width modulation operation with a switching frequency tuned so that the one frequency of the second vibration component equals one frequency of the first vibration component. For example, according to a further embodiment, the converter is configured for generating pulses for the pulse width modulation operation with a frequency that makes one of the PWM current harmonic frequency equal to the frequency of the first vibration component (the pattern of the PWM and the carrier frequency, also called switching frequency, act on the voltage spectrum in terms of voltage harmonic frequencies and magnitude, and thereafter on the current spectrum in the machine, also in term of frequencies and magnitude). For example, according to an embodiment, the electrical machine and the converter are adapted such that the frequencies of the strongest PWM vibrations match the frequencies of the vibrations which are due to fundamental current, i.e. the frequencies of slotting vibrations in an embodiment. According to an embodiment, in order to have destructive interference between the first vibration component and the second vibration component, the vibrations must be in a counterphase, i.e. shifted by about 180°.

According to a further embodiment, the first vibration component is of a space frequency (spatial order, for brevity denoted as "order" in the following) 0 or 2p, where p is the number of pole pairs of the electrical machine. In an embodiment, the largest pulse width modulation (PWM) excitations are of 0 and 2p order, where p is the number of pole pairs as mentioned above. Hence, for electrical machines where the largest vibrations resulting from a geometrical configuration of the electrical machine, e.g. slotting vibrations, have an order of 0 or 2p, it is therefore possible to create a destructive interference by adjusting the frequency and the phase angle of the PWM current harmonics. In an exemplary embodiment, adjustment of frequency and/or phase angle is performed by respective adjustment of the PWM carrier.

According to an embodiment, a phase-shift between the first vibration component and the second vibration component is fixedly predefined (i.e. not adapted during operation) by geometrical and electrical parameters of the electrical machine device. For example, according to an embodiment, the electrical machine device does not comprise, and is hence free of, an active control loop for adjusting the phase-shift. The optimal phase-shift can be obtained for example, according to one embodiment, by simulations. According to other embodiments, the optimal phase-shift is obtained experimentally.

In order to obtain an efficient destructive interference, besides the above-mentioned frequency match and the counterphase angle between the first vibration component and the second vibration component, in an embodiment a spatial order match is required, where the spatial order (spatial frequency) of the first vibration component matches the spatial order of the second vibration component.

According to an embodiment, the electrical machine is a synchronous machine which naturally provides a spatial order match. According to other embodiments, the electrical machine is an asynchronous machine, for example an induction machine, where a spatial order match is obtained at design stage via proper choice of slot number and pole number of the electrical machine.

According to a further embodiment, the electrical machine and the converter are adapted to each other such that the wave shapes of the first vibration component and the second vibration component are at least similar or identical.

According to an embodiment, the at least partial destructive interference between the first vibration component and the second vibration component is such that at least one vibration component is damped by at least 20%, i.e. the resulting amplitude of the at least one vibration component is reduced by at least 20% compared to the case without destructive interference.

According to other embodiments, the damping is at least 30% or at least 50%. The percentages relate to a linear scale.

According to a second aspect of the herein disclosed subject-matter, a method is provided, the method comprising adapting an electrical machine and a converter, which is electrically coupled to the electrical machine, to each other such that a first vibration component which originates from a configuration of the electrical machine and a second vibration component which originates from the converter at least partially interfere destructively.

According to embodiments of the second aspect, the electrical machine, the converter and/or the adaption of the electrical machine and the converter to each other are configured in accordance with embodiments and examples of the first aspect.

According to a third aspect of the herein disclosed subject-matter, there is provided a method of operating a converter, the converter being coupleable or being coupled to an electrical machine, the converter further being configured for generating a second vibration component in the electrical machine such that the second vibration component at least partially destructively interferes with a first vibration component in the electrical machine which originates from a configuration of the electrical machine.

For example in case the electrical machine is a motor, according to an embodiment the converter is configured for supplying a pulse width modulated input signal to the motor. In case the electrical machine is a generator, according to an embodiment the converter is configured for pulse width modulating an output current of the generator. In both cases, the converter generates PWM current harmonics in the electrical machine.

According to further embodiments of the third aspect, the converter, the method of its operation and/or its adaption to the electrical machine are configured in accordance with embodiments and examples of the first and/or second aspect.

According to a fourth aspect of the herein disclosed subject-matter, there is provided a computer program for controlling operation of a converter, the computer program being adapted for, when being executed by a data processor, controlling the method according to the third aspect or an embodiment thereof.

As used herein, reference to a computer program is intended to be equivalent to a reference to a program element and/or a computer-readable medium containing instruction for controlling a computer system to coordinate the performance of the method according to the third aspect or an embodiment thereof.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

Generally, aspects and embodiments of the herein disclosed subject matter may be realized by means of a computer program respectively software. However, aspects and embodiments of the herein disclosed subject matter may also be realized by means of one or more specific electronic circuits respectively hardware. Furthermore, aspects and embodiments of the herein disclosed subject matter may also be realized in a, hybrid form, i.e. in a combination of software modules and hardware modules.

In the following, there will be described exemplary embodiments of the herein disclosed subject-matter with reference to an electrical machine, a method of operating an electrical machine device, a method of operating a converter and a computer program. It has to be pointed out that of course any combination of features relating to different aspects of the herein disclosed subject-matter is also possible. In particular, some embodiments are described with reference to apparatus type claims, whereas other embodiments are described with reference to method type claims. However, a skilled person will gather from the above and from the following description that, unless otherwise notified, in addition to any combination of features belonging to one aspect also any combination between features relating to different aspects or embodiments, for example even between features of the apparatus type claims and features of the method type claims is considered to be disclosed with this application. Further, features which are explicitly disclosed with reference to an apparatus are also considered to be implicitly disclosed with reference to a method. Further, features which are explicitly disclosed with reference to a method are also considered to be implicitly disclosed with reference to an apparatus.

The aspects and embodiments defined above and further aspects and embodiments of the herein disclosed subject-matter are apparent from the examples to be described hereinafter which are explained with reference to the drawings but to which the invention is not limited.

DETAILED DESCRIPTION

Figure 1:
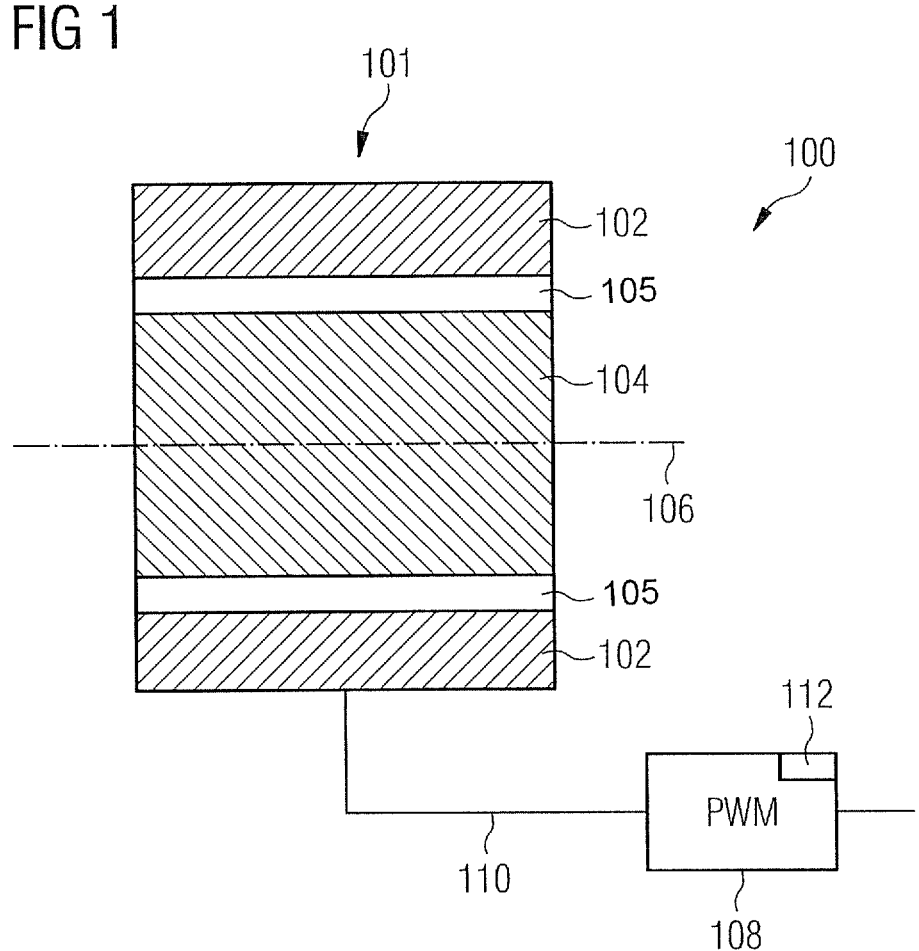
FIG. 1 shows an electrical machine in accordance with embodiments of the herein disclosed subject-matter.

The illustration in the drawings is schematic. It is noted that in different figures, similar or identical elements are provided with the same reference signs.

FIG. 1 shows a cross-sectional view of an electrical machine device 100 in accordance with embodiments of the herein disclosed subject-matter.

The electrical machine device 100 includes a stator 102 and a rotor 104. In an embodiment shown in FIG. 1, the stator is arranged radially outside the rotor. However, according to other embodiments, the rotor is arranged radially outside the stator. The rotor 104 and the stator 102 define an airgap 105 between the rotor 104 and the stator 102. Further, the rotor 104 defines an axis of rotation 106 about which the rotor 104 rotates in operation of the electrical machine 101. The electrical machine device 100 further comprises a converter 108 for converting electrical power. The converter 108 is electrically coupled to the electrical machine 101, e.g. by means of electrical lines indicated at 110 in FIG. 1. It should be noted, that although in FIG. 1 the converter 108 is coupled to the stator 102 of the electrical machine 101, according to other embodiments the converter 108 is coupled to the rotor or is coupled to both, the stator and the rotor.

According to an embodiment shown in FIG. 1, the electrical machine 101 is an electric motor which converts electrical energy supplied to the motor into mechanical energy. According to other embodiments (not shown), the electrical machine is an electric generator which converts mechanical energy supplied to the generator into electrical energy.

In accordance with embodiments of the herein disclosed subject-matter, the electrical machine 101 has a configuration which generates a first vibration component in the electrical machine 101. In particular, the first vibration component is due to a Maxwell force arising from the interaction of some stator and rotor mmf space harmonics linked with the fundamental current. The first vibration component remains unchanged when feeding the electrical machine with non-sinusoidal currents. Hence, according to this embodiment, the first vibration component is independent of the pulse width modulated current supplied to the electric machine 101.

Further in accordance with embodiments of the herein disclosed subject-matter, the converter 108 generates a second vibration component in the electrical machine 101. According to an embodiment, in the electrical machine device 100 in FIG. 1 the converter 108 generates a second vibration component which is due to a Maxwell force which disappears as soon as the electrical machine is fed with purely sinusoidal currents. For example, if the converter 108 applies pulse width modulation (PWM), the second vibration component is due to a Maxwell force generated by a PWM current harmonic in one embodiment. It should be noted that generally herein the term "harmonic" also includes the fundamental vibration and higher order vibrations.

The switching frequency of the pulse width modulation can easily be changed on converters where a synchronous PWM strategy is available. Therefore, the frequency of the strongest PWM vibration can easily be matched to the one of a vibration due to the fundamental current (slotting vibrations). However, for having destructive interference to a large extent, this frequency match condition is not enough, but also the wave shapes of both excitations should be the same or at least similar, the frequency should be in counterphase and the spatial order of both vibrations should match. For such embodiments, destructive interference to a large extent is obtained. PWM excitations have 0 or 2p orders in one embodiment, where p is the number of pole pairs. For electrical machines where some slotting vibrations also have an order 0 or 2p (it is not necessarily the largest ones), it is therefore possible to create interference by adjusting the frequency and the phase angle of the PWM current harmonics which can for example be done by changing the time reference of the modulating signals. For example, for a three phase permanent machine, where the main slotting vibrations are known to be of order 0 or 2p, and where the main slotting vibrations are proportional to 6 times the fundamental stator frequency (6kf, where k equals 1, 2, 3, . . . , and f is the frequency of the fundamental current provided to the stator. These slotting vibrations can therefore be used to cancel main PWM vibrations that are sometimes stronger and noisier than slotting vibrations. For a regular triangular symmetrical carrier, largest PWM vibration harmonics are respectively: order 0 of frequency 2 fs, wherein fs is the switching frequency, order 2p of frequencies 2 fs+/−2 f. If p is high, i.e. p>3, vibrations of order 2p are damped by the structure of the electrical machine, so main vibrations are of frequencies 6kf of order 0 and 2fs of order 0. The PWM vibration can therefore be cancelled by choosing fs=3kf and the proper PWM current harmonic phase angle. Again, here fs is switching frequency of the converter 108, k is a natural number (1, 2, 3, . . . ), and f is the frequency of the fundamental current provided to the stator. Experiments showed that the interference is more effective if K is low.

Figure 2:
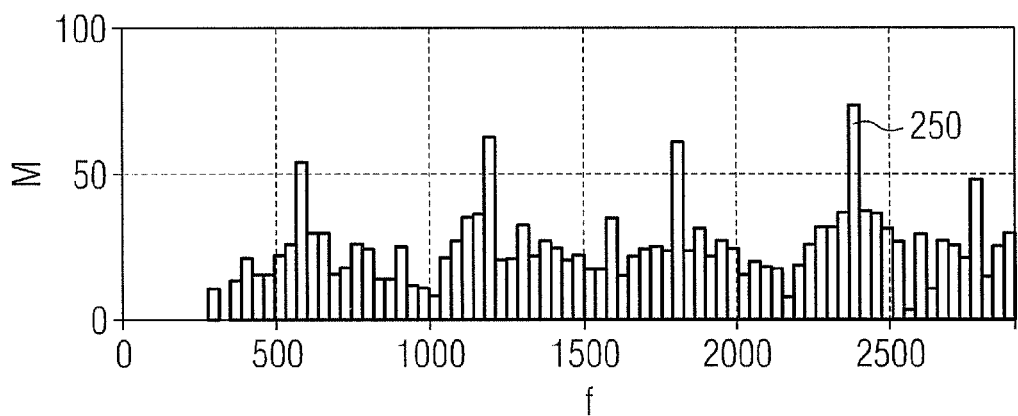
FIG. 2 shows a simulated acoustic spectrum without optimal phase-shift for destructive interference between PWM and slotting vibrations.
Figure 3:
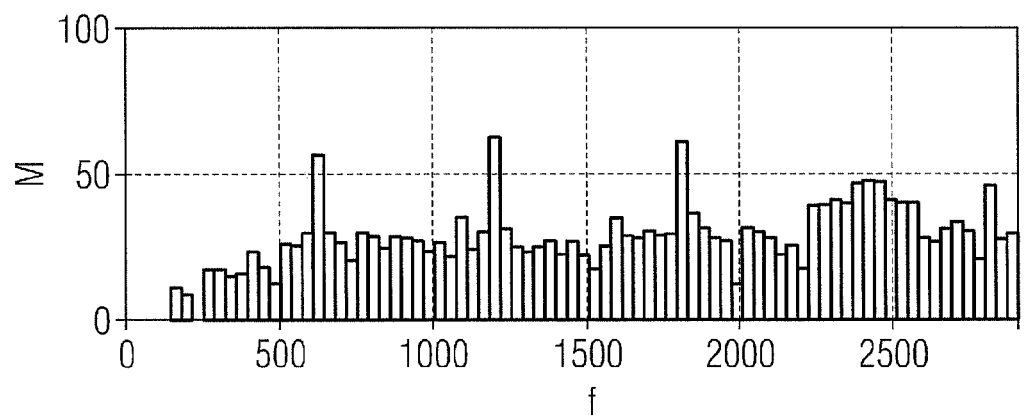
FIG. 3 shows a simulated acoustic spectrum with an optimal phase-shift for destructive interference between PWM and slotting vibrations.

FIG. 2 shows a simulated acoustic spectrum (A-weighted magnetic sound power level spectrum) of a p=6 pole permanent magnet machine for f=200 Hz and fs=6f=1200 Hz, without looking for the right phase angle which creates the destructive interference. Since hence destructive interference does not occur, a main acoustic line 250 near 2400 Hz is caused by both, slotting and PWM vibrations (first and second vibration components). In FIG. 3, this line at 2400 Hz is fully cancelled by the optimal phase-shift between the first vibration component and the second vibration component, i.e. by slotting vibrations and PWM vibrations in the illustrated embodiment. The units in FIG. 2 and FIG. 3 are Herz (Hz) for the frequency f, and "dBA re. 1 pW" for the magnitude M, i.e. the magnitude is normalized to 1pW (1e-12 W).

The optimal phase-shift can be obtained analytically from the geometrical and electrical parameters of the machine, so it is not necessary to have an active control loop based on e.g. an accelerometer. The optimal phase-shift can also be obtained experimentally. Hence, according to an embodiment, the electrical machine device 100 is free of an active control loop for adjusting the phase-shift between the first vibration component and the second vibration component.

As already mentioned earlier, the herein disclosed subject-matter is also suitable for induction machines, where the number of rotor slots Zr is proportional to 2p. In this case, slotting vibration orders are also proportional to 2p as the number of stator slots Zs is always proportional to 2p and the destructive interference can occur with a proper phase-shift.

According to an embodiment, adaption of the converter to the electrical machine may be performed by providing a control unit 112 for controlling the converter 108 in a manner such that the first vibration component and the second vibration component at least partially interfere destructively. As mentioned earlier, the phase angle of the PWM current harmonics may e.g. be changed by changing the time reference of PWM carrier. However, in other embodiments, the phase angle may be adjusted to the optimal value by any other suitable means. According to an embodiment, adjustment of the phase angle is provided by respective control of the converter 108. To this end, the control unit 112 may be respectively adapted. Generally, the control unit 112 may include a processor for executing a computer program.

According to an embodiment, the phase shift is determined from mechanical and electrical parameters of the electrical machine 101 before operation of the electrical machine. In this case, a fixed value for the phase angle may be preset in the converter 108.

According to an embodiment, any suitable component of the converter 108, e.g. the control unit 112, is provided in the form of a respective computer program product which enables a processor to provide the functionality of the converter as disclosed herein. According to other embodiments, any such component of the converter is provided in hardware. According to other, mixed, embodiments, some of these components are provided in software while others of these components are provided in hardware. Further, it should be noted that a separate component may be provided for each of the functions of the converter disclosed herein. According to other embodiments, at least one component of the converter is configured for providing two or more functions of the converter as disclosed herein.

It should be noted, that the term "comprising" does not exclude other elements or steps and that "a" or "an" does not exclude a plurality. Also elements described in association with different embodiments may be combined. It should also be noted that the reference signs in the claims should not be construed as limiting the scope of the claims.

In order to recapitulate the above embodiments of the herein disclosed subject-matter, one can state:

An electrical machine device is disclosed, the electrical machine device comprising an electrical machine and a converter electrically coupled to the electrical machine. A configuration of the electrical machine generates a first vibration component in the electrical machine and the converter generates a second vibration component in the electrical machine. The electrical machine and the converter are adapted to each other such that the first vibration component and the second vibration component at least partially interfere destructively. Further, respective methods and computer programs for controlling a converter or operating a converter are disclosed.

The invention claimed is:

1. An electrical machine device, comprising:
   an electrical machine comprising a rotor, a stator and an airgap between the rotor and the stator;
   said electrical machine having a configuration which generates a first vibration component in the electrical machine by a reluctance variation along said airgap of said electrical machine or other harmonics linked with a fundamental current;
   a converter that converts electrical power, the converter being electrically coupled to the electrical machine; and
   said converter applying a pulse width modulation to generate a second vibration component in the electrical machine, said second vibration component being due to a Maxwell force generated by a pulse width modulation current harmonic;
   wherein the configuration of the electrical machine and the converter are adapted to each other such that the first vibration component and the second vibration component at least partially interfere destructively,
   wherein the electrical machine and the converter are configured with respect to each other such that the wave shapes of the first vibration component and the second vibration component are at least similar or identical wherein first vibration component and the second vibration component are in a counterphase and wherein the spatial order of the first vibration component matches the spatial order of the second vibration component.

2. The electrical machine device according to claim 1, wherein the first vibration component and the second vibration component are magnetic force vibrations.

3. The electrical machine device according to claim 1, wherein the first vibration component or the second vibration component are magnetic force vibrations.

4. The electrical machine device according to claim 1, wherein the converter is configured for generating pulses for the pulse width modulation operation with a switching frequency tuned so that one frequency of the second vibration component equals one frequency of the first vibration component.

5. The electrical machine device according to claim 1, wherein the first vibration component is of spatial order 0 or 2p, where p is the number of pole pairs of the electrical machine.

6. The electrical machine device according to claim 1, wherein a phase shift between the first vibration component and the second vibration component is defined by geometrical and electrical parameters of the electrical machine.

7. A method of operating a converter applying pulse width modulation, the converter being coupleable to an electrical machine that comprises a rotor, a stator and an airgap between said rotor and said stator, the method comprising:

generating a second vibration component via said pulse width modulation such that the second vibration component at least partially destructively interferes with a first vibration component generated in the electrical machine, wherein the first vibration component originates from a configuration of the electrical machine and is generated by a reluctance variation along said airgap of said electrical machine or other harmonics linked with a fundamental current, wherein the second vibration component is due to a Maxwell force generated by a pulse width modulation current harmonic, and wherein the wave shapes of the first vibration component and the second vibration component are at least similar or identical wherein first vibration component and the second vibration component are in a counterphase and wherein the spatial order of the first vibration component matches the spatial order of the second vibration component.

8. The method according to claim 7, wherein the generating second vibration component is by a pulse width modulation operation of the converter.

9. The method according to claim 8, wherein the generating of pulses for the pulse width modulation operation is by a switching frequency tuned so that one frequency of the second vibration component equals one frequency of the first vibration component.

10. A computer program for controlling operation of a converter, the computer program being adapted for, when being executed by a data processor, controlling the method according to claim 7.

* * * * *